(12) United States Patent
Blaettner

(10) Patent No.: US 9,692,272 B2
(45) Date of Patent: Jun. 27, 2017

(54) ELECTRIC MACHINE AND ASSOCIATED METHOD

(71) Applicant: Regal Beloit America, Inc., Beloit, WI (US)

(72) Inventor: Harald Edmund Blaettner, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 703 days.

(21) Appl. No.: 13/799,945

(22) Filed: Mar. 13, 2013

(65) Prior Publication Data

US 2014/0265686 A1 Sep. 18, 2014

(51) Int. Cl.
*H02K 5/16* (2006.01)
*F16C 35/067* (2006.01)
*F16C 25/08* (2006.01)
*F16C 19/06* (2006.01)

(52) U.S. Cl.
CPC ............ *H02K 5/16* (2013.01); *F16C 25/083* (2013.01); *F16C 35/067* (2013.01); *F16C 19/06* (2013.01); *F16C 2380/26* (2013.01)

(58) Field of Classification Search
CPC ....... H02K 5/16; F16C 25/083; F16C 35/067; F16C 2226/10; F16C 2380/26
USPC ...................................... 310/89, 90, 91, 425
IPC ....................................................... H02K 5/16
See application file for complete search history.

(56) References Cited

U.S. PATENT DOCUMENTS

| 1,923,390 | A | * | 8/1933 | Parkhurst | B24B 33/08 |
| | | | | | 451/472 |
| 2,762,198 | A | | 9/1956 | Ullery | |
| 4,364,615 | A | * | 12/1982 | Euler | F16C 27/04 |
| | | | | | 267/159 |
| 5,013,990 | A | | 5/1991 | Weber | |
| 5,087,847 | A | * | 2/1992 | Giesbert | F02M 3/07 |
| | | | | | 267/161 |
| 5,221,444 | A | | 6/1993 | Silveri | |
| 5,544,036 | A | | 8/1996 | Brown, Jr. | |
| 5,761,083 | A | | 6/1998 | Brown, Jr. | |
| 6,247,702 | B1 | | 6/2001 | Long | |
| 6,288,466 | B1 | * | 9/2001 | Lauk | F16C 25/08 |
| | | | | | 310/216.074 |
| 6,299,699 | B1 | | 10/2001 | Porat | |
| 6,705,763 | B2 | * | 3/2004 | Kamura | B60B 27/00 |
| | | | | | 384/539 |
| 6,778,893 | B2 | | 8/2004 | Murakami | |

(Continued)

FOREIGN PATENT DOCUMENTS

| CN | 101012665 A | 8/2007 |
| EP | 17685 A1 | 10/1980 |

(Continued)

*Primary Examiner* — John K Kim
(74) *Attorney, Agent, or Firm* — John Wagley

(57) ABSTRACT

A bearing assembly cooperates with a bearing seat formed in a bearing housing and includes a bearing having an inner ring, an outer ring and a rolling element in engagement with the rings and an anti-rotation device. The anti-rotation device engages the outer ring to the bearing housing limiting rotation of the outer ring within the bearing seat. The anti-rotation device includes a first feature engaging the outer ring and a second feature engaging the bearing housing. The features limit the rotation of the outer ring within the bearing seat. The first feature has a resilient protrusion with a contact surface for engagement with the outer ring.

18 Claims, 12 Drawing Sheets

(56) References Cited

U.S. PATENT DOCUMENTS

| | | | |
|---|---|---|---|
| 7,507,049 B2* | 3/2009 | Eidam | F16B 21/18 403/315 |
| 7,670,079 B2* | 3/2010 | Snadden | F16B 21/20 384/535 |
| 8,186,904 B2* | 5/2012 | Snadden | F16B 21/20 384/535 |
| 9,388,860 B2* | 7/2016 | Berube | F16D 1/116 |
| 2002/0032511 A1 | 3/2002 | Murakami | |
| 2009/0151801 A1 | 6/2009 | Gorman | |
| 2011/0097144 A1* | 4/2011 | Snadden | F16B 21/20 403/372 |
| 2012/0029705 A1 | 2/2012 | Broniak | |
| 2012/0053737 A1 | 3/2012 | Valluri | |
| 2012/0073040 A1 | 3/2012 | Cohen | |
| 2012/0104878 A1 | 5/2012 | Heilman | |
| 2012/0107140 A1 | 5/2012 | Stiles, Jr. | |
| 2012/0219428 A1 | 8/2012 | Cantolino | |
| 2014/0265686 A1* | 9/2014 | Blaetner | F16C 35/067 310/90 |

FOREIGN PATENT DOCUMENTS

| | | |
|---|---|---|
| EP | 17685 B1 | 3/1984 |
| EP | 1041220 A2 | 10/2000 |
| EP | 1147332 B1 | 9/2004 |
| EP | 1041220 B1 | 9/2007 |
| GB | 590788 A | 7/1947 |
| GB | 814078 A | 5/1959 |
| GB | 912374 A | 12/1962 |
| JP | 2000339036 A | 12/2000 |
| JP | 2002051963 A | 2/2002 |
| JP | 03302788 B2 | 7/2002 |
| JP | 2006029372 A | 2/2006 |
| JP | 2006226318 A | 8/2006 |
| JP | 2007309383 A | 11/2007 |
| JP | 2009029578 A | 2/2009 |
| JP | 2011163486 A | 8/2011 |
| JP | 2011174484 A | 9/2011 |
| JP | 2011174486 A | 9/2011 |
| JP | 2012072694 A | 4/2012 |
| WO | 2006124006 A2 | 11/2006 |
| WO | 2009076565 A1 | 6/2009 |

* cited by examiner

ELECTRIC MACHINE AND ASSOCIATED METHOD

BACKGROUND OF THE INVENTION

The embodiments described herein relate generally to an electric machine, and more specifically, to a bearing assembly with a relative motion [bearing creep] impeding device associated with the electric machine.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil.

The centrally located shaft supports a rotor. The rotor is the non-stationary part of a rotary electric motor, electric generator or alternator. Motor efficiency is improved by decreasing the degree of slip between the rotor and the stator for a given load. One way to decrease the slip is by increasing the mass of the rotor. The rotor includes conductors, conductor bars and end-plates which transfer current, magnetic field and torque to the rotor and consequently torque to the shaft.

The shaft rotatably supports the substantial weight of the rotor within the electric machine. At least one bearing and typically a pair of spaced apart bearings support the shaft within a housing of the electric machine. The bearings may be any bearing capable of supporting the loads involved and of enduring the rotational speeds of the motor. Typically modern electric machines utilize rolling element bearings, typically ball bearings to support the shaft and rotor. The ball bearings include an inner ring and an outer ring separated by a series of spherical elements or balls. While the shaft is typically rigidly secured to the inner ring, the outer ring is permitted to move axial in the housing, to accommodate various phenomenon including temperature changes, temperature differential between the elements, dissimilar materials, and tolerance stacks.

When the bearing is positioned with the shaft horizontal to the horizon or ground, a substantial radial load from the rotor is applied to the bearing. This radial load serves to inhibit relative motion or rotation of the bearing outer ring in the housing. However when the bearing is positioned with the shaft vertical with respect to the horizon or ground, radial loads can be zero or minimal, permitting relative slippage to occur between the bearing outer ring and the housing.

The initial relative slippage is exasperated by the formation of metal debris that forms a lapping compound between the bearing outer ring and the housing bore. This lapping may quickly greatly enlarge the housing bore, causing excessive noise and excessive movement between the motor stator and the motor rotor, resulting in rotor/stator strike. The noise and strike may lead to early bearing and resultant motor failure.

Many practical applications utilize motors with vertical shafts. For example, pumps for pools and spas and cooling fans, particularly those to cool air conditioning compressors. These applications are plagued with bearing failures caused by the relative motion of the motor bearing outer ring in the motor housing, also known as bearing creep. Typically, vertical cooling fan motors have a vertical shaft extending upwardly from the motor and from which a fan is attached. The motor typically has an upper unconstrained bearing and a lower constrained bearing. The upper unconstrained bearing, being closer to the fan, has a greater tendency for creep, but creep can occur in any bearing application, particularly those where accommodation is made for the bearing to move axially with respect to its housing.

Various methods are used to limit the bearing creep. One method is to eliminate any relative motion, including axial motion, by providing an interference fit between the bearing outer ring and the housing or by using an adhesive between the outer ring and housing. However any solution that eliminates all relative motion has the disadvantage of not accommodating various phenomenon including temperature changes, dissimilar materials, and tolerance stacks that affect the relative axial position of the inner ring with respect to the outer ring. Such a solution may result in excessive bearing preloads and reduced bearing life. Further, interference fit between both bearing races is not recommended by bearing manufacturers.

Other methods, such as placing an o-ring, a polymer ring, an EC (expansion compensating bearing), between the bearing and the housing are either ineffective or not sufficiently durable. The present invention is directed to alleviate at least some of these problems with the prior art.

BRIEF DESCRIPTION OF THE INVENTION

In one aspect, a bearing assembly cooperates with a bearing seat formed in a bearing housing and includes a bearing 54 (see FIG. 2) having an inner ring, an outer ring and a rolling element in engagement with the rings and an anti-rotation device. The anti-rotation device engages the outer ring to the bearing housing 18 (see FIG. 2) limiting rotation of the outer ring 62 (see FIG.2) within bearing seat 59 (see FIG. 2). The anti-rotation device includes a first feature engaging the outer ring and a second feature engaging the bearing housing. The features limit the rotation of the outer ring within the bearing seat. The anti-rotation device includes a first feature that engages the outer ring of the bearing. The first feature has a resilient protrusion with a contact surface with limited contact area for engagement with the outer ring.

In another aspect, an anti-rotation device for use with a bearing in an electric machine is provided. The anti-rotation device is adapted for engagement with the outer ring of the bearing and with the bearing housing to limit the rotation of the outer ring of the bearing within the bearing seat formed in the bearing housing. The anti-rotation device includes a first feature for engagement with the outer ring of the bearing and a second feature for engagement with the bearing housing. The first feature and the second feature are adapted to limit the rotation of the outer ring of the bearing within the bearing seat formed in the bearing housing. The first feature has a resilient protrusion with a contact surface with a limited contact area for engagement with the outer ring.

In yet another aspect, an electric machine includes a housing, a stator secured to the housing, a rotor, a bearing and an anti-rotation device. The rotor is rotatably associated with the housing. The rotor is supported by a shaft. The bearing has an inner ring and an outer ring. The bearing rotatably secures the rotor to the housing. The anti-rotation device cooperates with the bearing which is mounted in the housing of an electric machine. The anti-rotation device engages with the outer ring of the bearing and with the bearing housing to limit the rotation of the outer ring of the bearing within the bearing seat which is formed in the bearing housing. The anti-rotation device includes a first feature for engagement with the outer ring of the bearing and a second feature for engagement with the bearing housing. The first feature and the second feature limit the rotation of the outer ring of the bearing within the bearing housing. The first feature has a resilient protrusion with a contact surface with a limited contact area for engagement with the outer ring.

In yet another aspect, a method for containing a bearing in an electric machine is provided. The method includes the steps of providing an anti-rotation device for use with a bearing having an inner ring and an outer ring, of engaging the anti-rotation device with the outer ring of the bearing and of engaging the anti-rotation device with the bearing housing to limit the rotation of the outer ring of the bearing within the bearing seat formed in the bearing housing. The anti-rotation device includes a first feature for engagement with the outer ring of the bearing. The first feature includes an internal surface for engagement with the outer ring of the bearing and a second feature for engagement with the bearing housing. The first feature and the second feature limit the rotation of the outer ring of the bearing within the bearing housing. The first feature has a resilient protrusion with a contact surface with a limited contact area for engagement with the outer ring.

BRIEF DESCRIPTION OF THE DRAWINGS

FIG. 4A is a partial enlarged cross sectional view of an alternate embodiment of the bearing assembly of the present invention, similar to that of FIG. 1, but having a different groove construction and showing the spring bearing retainer and mating groove in greater detail;

DETAILED DESCRIPTION OF THE INVENTION

The methods, systems, and apparatus described herein provide improved support for a rotor within a stator of an electric machine. Bearings that support the rotor in the stator need to provide for axial movement of the bearing relative to the machine housing, while inhibiting rotation of the bearing outer ring in the bearing housing. Difficulties may occur providing for the axial movement, while inhibiting rotation. Bearing creep may occur resulting in noise and reduced life for the electric machine.

The methods, systems, and apparatus described herein assist in the proper support for a rotor within a stator of an electric machine. The methods, systems, and apparatus described herein are further directed to facilitate quieter operation. Furthermore, the methods, systems, and apparatus described herein provide for an improved life and durability of the motor and its appeal to the customer.

Technical effects of the methods, systems, and apparatus described herein include at least one of improved performance and quality and reduced labor costs.

Figure 1:
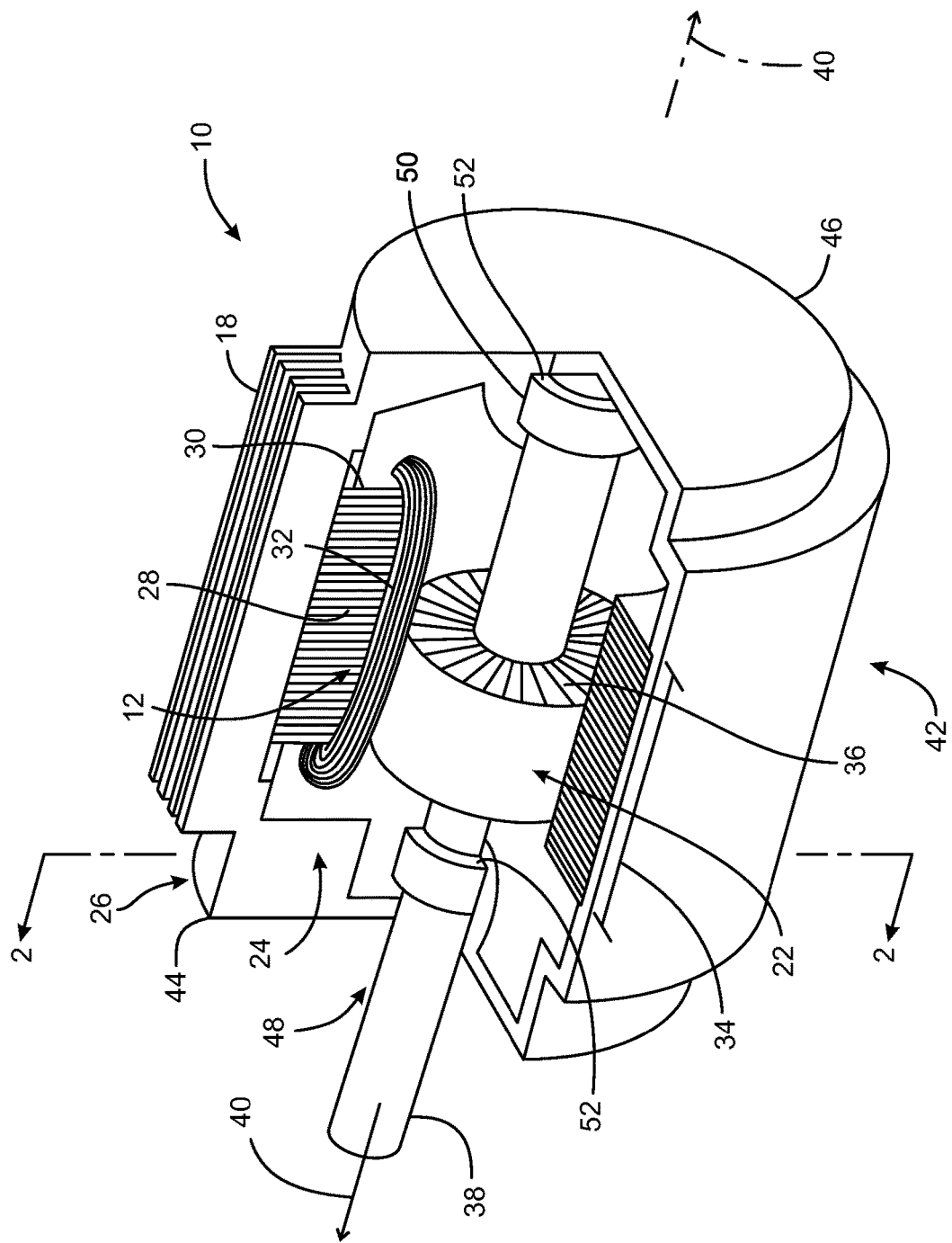
FIG. 1 is a perspective view of a motor embodying the bearing assembly having the anti-rotation device of the present invention.

FIG. 1 is a perspective view of an exemplary electric machine 10. While the machine 10 may be any electric machine including generators and motors, typically the machine is an electric motor. The motor 10 may have any orientation, horizontal, vertical or otherwise. As shown the motor has a vertical orientation with the shaft extending upwardly out of the motor housing.

The electric machine 10 includes a stationary assembly 12. Electric machine 10 also includes a machine assembly housing 18 and a rotatable assembly 22. Machine assembly housing 18 defines an interior 24 and an exterior 26 of machine 10 and is configured to at least partially enclose and protect stationary assembly 12 and rotatable assembly 22. Stationary assembly 12 includes a stator core 28, which includes a plurality of stator teeth or projections 30. Stator end caps are positioned over opposed end teeth of the plurality of stator teeth 30. Wire is wound around stator teeth 30 and the stator end caps to form each of a plurality of windings 32.

In an exemplary embodiment, stationary assembly 12 is a three phase salient pole stator assembly. Stator core 28 is formed from a stack of laminations made of a highly magnetically permeable material, and windings 32 are wound on stator core 28 in a manner known to those of ordinary skill in the art. Laminations are stacked such that stator core 28 reaches a predefined length 34. In the exemplary embodiment, the plurality of laminations that form the stator core 28 may be either interlocked or loose laminations. In an alternative embodiment, stator core 28 is a solid core. For example, stator core 28 may be formed from a soft magnetic composite (SMC) material, a soft magnetic alloy (SMA) material, and/or a powdered ferrite material using a sintering process. In another alternate embodiment, the windings 32 are wound around a plurality of spools (not shown), each of which is removably fitted to one of the stator teeth 30.

In one embodiment, rotatable assembly 22 includes a permanent magnet rotor core 36 and a shaft 38 and is configured to rotate around an axis of rotation 40. In the exemplary embodiment, rotor core 36 is formed from a stack of laminations made of a magnetically permeable material and is substantially received in a central bore of stator core 28. While FIG. 1 is an illustration of a three phase electric motor, the methods and apparatus described herein may be included within machines having any number of phases, including single phase and multiple phase electric machines.

In the exemplary embodiment, electric machine 10 is coupled to a fan (not shown) for moving air through an air handling system, for blowing air over cooling coils, and/or for driving a compressor within an air conditioning/refrigeration system. The shaft 38 of the machine 10 extends as shown vertically upward from the machine and is used to secure the fan to the shaft. Alternatively the electric machine may be coupled to a pump for use in pools, spas, and the like. More specifically, machine 10 may be used in air moving applications used in the heating, ventilation, and air conditioning (HVAC) industry, for example, in residential applications using ⅓ horsepower (hp) to 1 hp motors or greater and/or in commercial and industrial applications and hermetic compressor motors used in air conditioning applications using higher horsepower motors, for example, but not limited to using ⅓ hp to 7.5 hp motor or greater. Although described herein in the context of an air handling system, electric machine 10 may engage any suitable work component and be configured to drive such a work component. Alternatively, electric machine 10 may be coupled to a power conversion component, for example, an engine, a wind turbine rotor, and/or any other component configured to rotate rotatable assembly 22 to generate electricity using electric machine 10.

Continuing to refer to FIG. 1, the housing 18 of motor 10 includes a central portion 42 and opposed motor end caps 44 and 46, secured to central portion 42 of housing 18. Bearing assemblies 48 and 50 are mounted in end caps 44 and 46, respectively and support the shaft 38 of rotor 22 for rotation within housing 18 of motor 10. It should be appreciated that only one end cap may be used with the other end cap being integral with the central portion of the housing.

According to the present invention, one or both of the bearing assemblies 48 and 50 include an anti-rotation device 52 according to the present invention. The bearing assemblies 48 and 50 support opposed ends of shaft 38. As shown bearing assembly 52 in the upper end cap 44 is typically is not captive to the cap 44 (the bearing assembly 52 is unconstrained (not contained on its lower side and can move to the down relative to end cap 44). Conversely, the bearing assembly 50 in the lower end cap 46 is typically constrained. The shaft 38 in turn supports a rotor, for example and as shown, permanent magnet rotor core 36.

Continuing to refer to FIG. 1, the bearing assembly 48 and the bearing assembly 50 may be similar, and for simplification identical to each other. Therefore the description of bearing assembly 48 may equally apply to bearing assembly 50.

Figure 2:
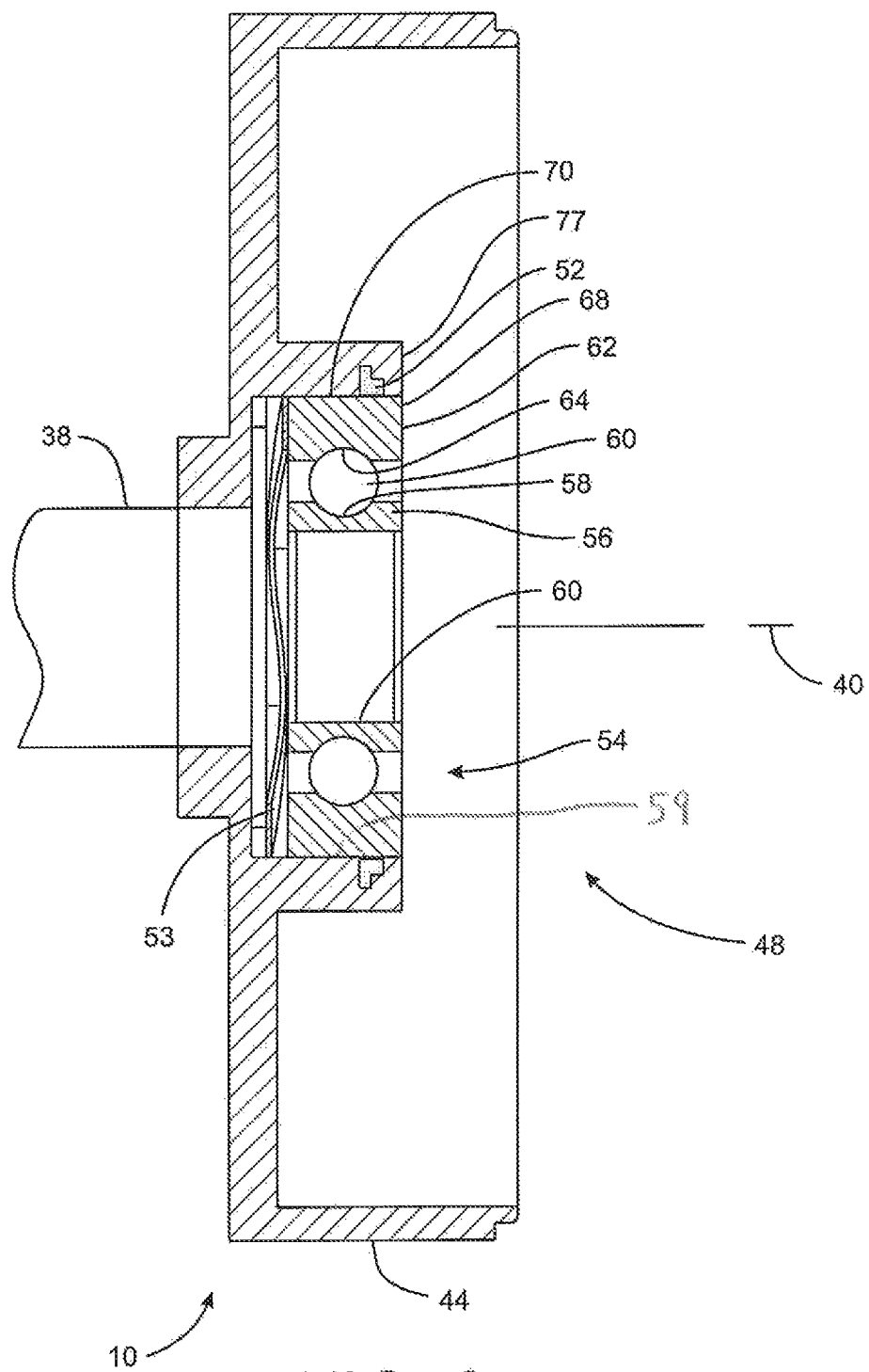
FIG. 2 is a cross sectional view of the end cap assembly of the motor of FIG. 1 along the line 2-2 in the direction of the arrows.
Figure 3:
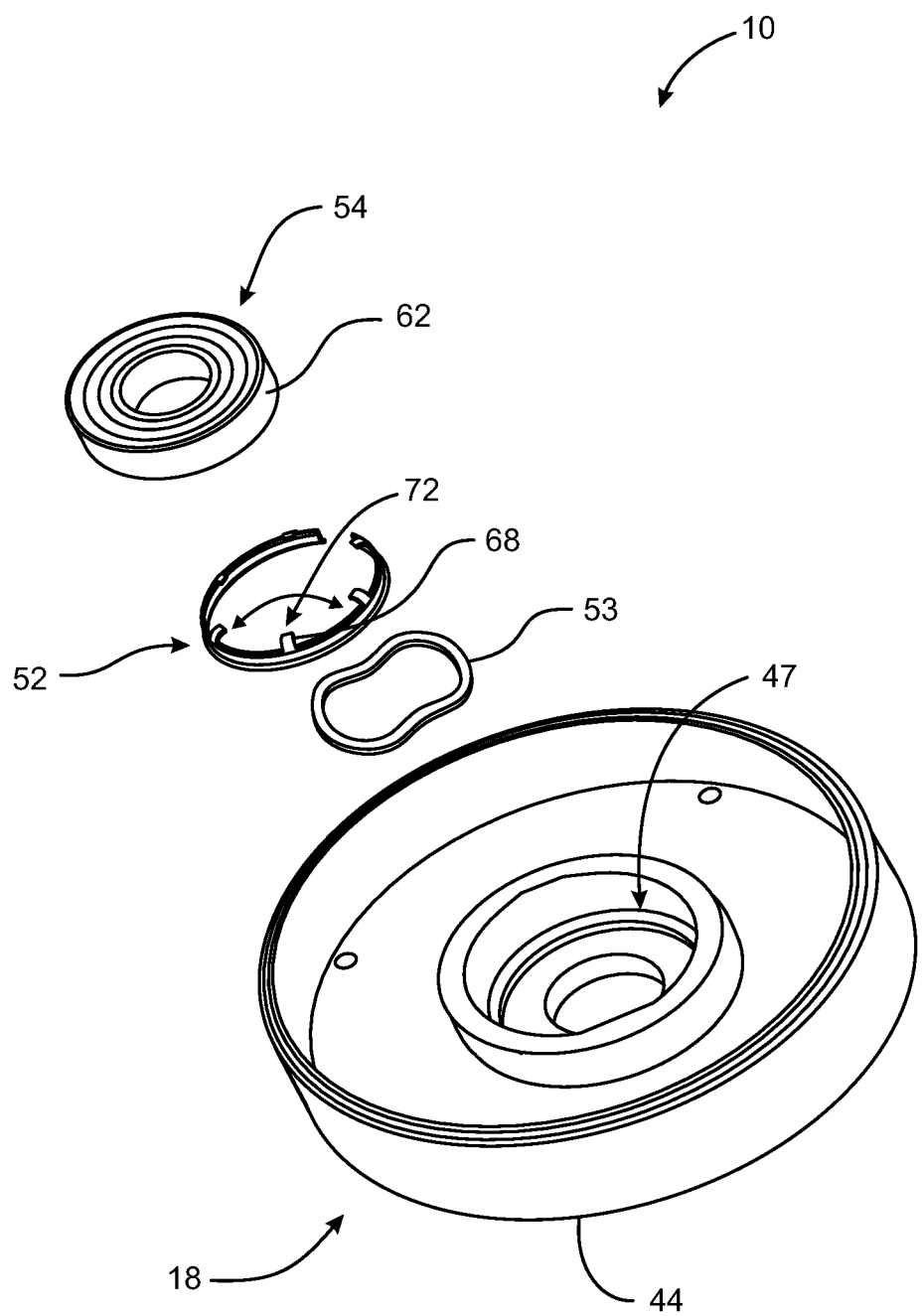
FIG. 3 is an exploded perspective view, partly in cross section, of the end cap assembly of FIG. 2.

Referring now to FIG. 2, the bearing assembly 48 includes the anti-rotation device 52 as well as the bearing 54. The bearing 54 may be any bearing capable of supporting the rotor core 36. For example the bearing may be any type of rolling element bearing. To permit operation speeds for modern electrical machine and to provide sufficient bearing life and as shown in FIG. 3, the bearing may be a ball bearing 54. The bearing 54 includes an inner ring 56 surrounded on its outer periphery or inner race 58 by rolling elements or balls 60. A bearing ball retainer, not shown, may be used to space the balls 60 about the bearing. An outer ring 62 surrounds balls 60 on its inner periphery or outer race 64 of outer ring 62.

The inner ring 56 includes an inner surface or bore 66 to which the shaft 38 (see FIG. 1) is fitted. The shaft 38 may have any suitable fit with the bore 66 and may be in clearance, slip fit or interference fit with the bore 66. The shaft may be fixed to the bore of bearing by a press or interference fit or may be locked to it by adhesives or a device, such as a bearing collar, not shown.

According to the present invention and as shown in FIG. 2, the bearing assembly includes the anti-rotation device 52. The anti-rotation device 52, as shown, engages the outer ring 62 of bearing 54. The device 52 may engage the outer ring 62 at any position of the device and at any position of the ring. As shown the device 52 has a device protrusion 68 which engages outer ring outer periphery or outer diameter 70 of outer ring 62 of bearing 54.

Alternatively, the first and second bearing assemblies 48 and 50, respectively, may further include a second antirotation device in the form of a wavy spring 53 positioned between bearing 54 and housing end caps 44 and 46, respectively.

As shown in FIG. 2, the upper end cap 44 is on the loaded end of the motor 10, where the outer ring 62 is not captive to the cap 44 (the outer ring 62 is not contained below or on the right of the ring 62 and can move to the right or downwardly relative to end cap 44 as shown). It should be appreciated that the anti-rotation device 52 may also be used on lower end cap 46 (see FIG. 1) which may be the non-loaded end of the motor 10. In such an application, the anti-rotation device 52 could be used as a method of capturing the outer ring of the bearing of bearing assembly 50 (see FIG. 1) from rotation within end cap and may replace or supplement normal locking mechanisms such as clamps.

Referring now to FIG. 3, the device 52 may engage the outer ring 62 in any effective way, by a first feature or device bearing engagement feature 72, for example, feature 72 may be in the form of providing a device (not shown) or the feature 72 may be an adhesive, or the device and the ring may have mating features (not shown) to engage each others.

As shown in FIG. 3, the anti-rotation device 52 and the bearing 54 are shown in an exploded position for assembly into bore 47 of end cap 44 of housing 18 of motor 10. It should be appreciated that additional components may be used to complete the motor 10 of present invention. For example, as shown, and the wavy spring 53 may be positioned in bore 47 of end cap 44 to engage bearing 54.

Figure 4:
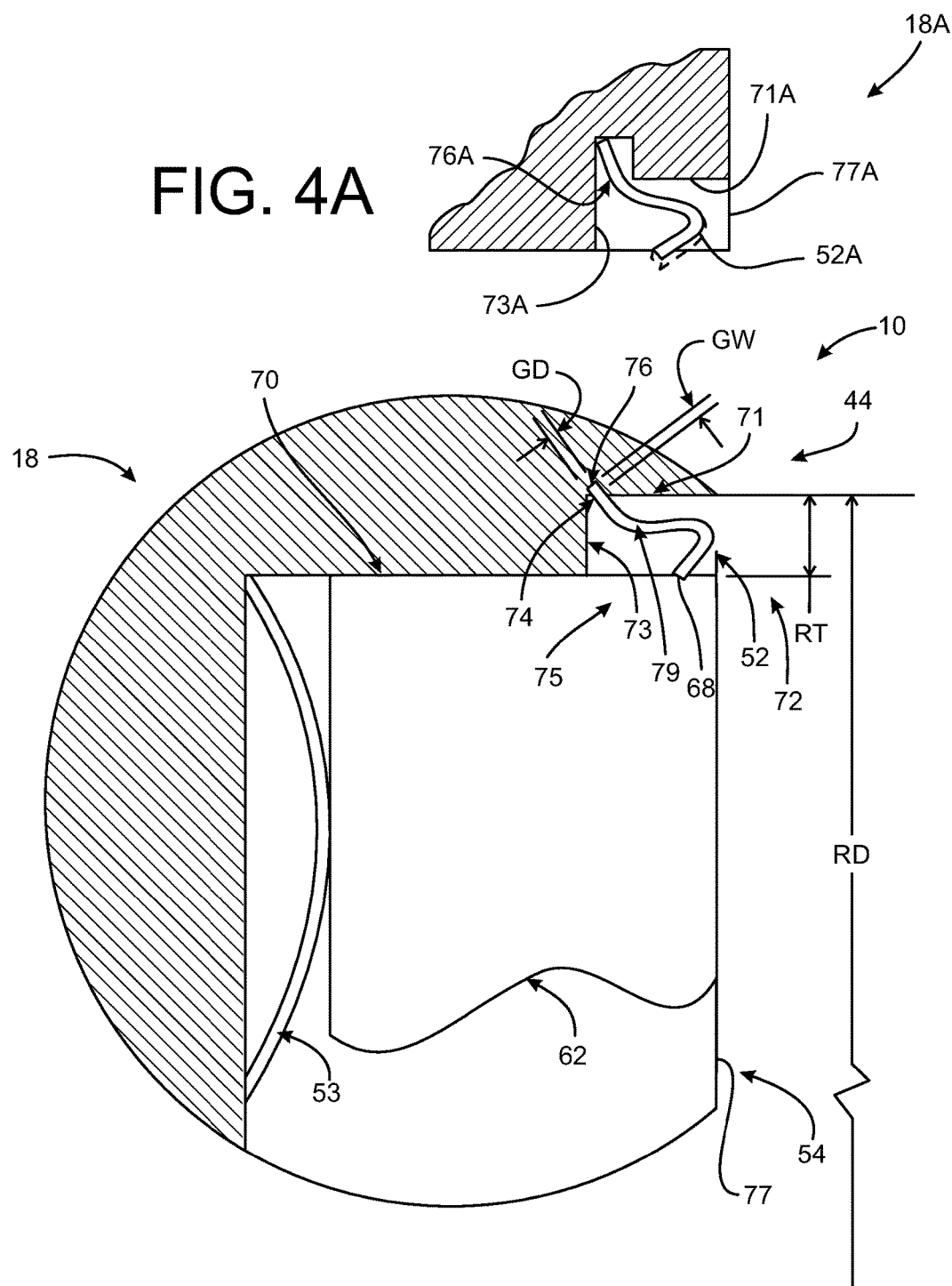
FIG. 4 is a partial enlarged cross sectional view of the end cap assembly of FIG. 2 showing the spring bearing retainer in greater detail.

Referring now to FIG. 4, the device 52 may, as shown, engage the outer ring 62 at outer ring outer diameter 70 of outer ring 62. The engagement of device 52 to outer diameter 70 may, as shown, be made by device protrusion 68 which engages outer ring outer diameter 70 of outer ring 62 of bearing 54 and serves as the first engagement feature 72.

Referring again to FIG. 4, the anti-rotation device 52 includes the first feature 72 for engagement with the outer ring 62 of the bearing 54. The anti-rotation device 52 also engages the motor assembly housing 18 in any effective way, by a second feature or device housing engagement feature 74. For example, the second feature or device housing engagement feature may be in the form of providing a additional engaging device (not shown) or, as shown, the feature 74 may cooperate with a mating feature on the housing 18 to engage each. The first feature 72 and the second feature 74 cooperate with each other and are adapted to limit the rotation of the outer ring 62 of the bearing 54 within the bearing housing 18.

As shown in FIG. 4, the anti-rotation device 52 engages the motor assembly housing 18 in any effective way, by a second feature or device housing engagement feature 74, for example, feature may be in the form of providing a additional engaging device (not shown) or, as shown, the feature 74 may cooperate with a mating feature on the housing 18 to engage each other.

As shown in FIG. 4, the second feature or second engagement feature 74 is in the form of an outer flange 74. The outer flange 74 of the anti-rotation device 52 cooperates with a housing device engagement feature 76 located on the assembly housing 18. The housing device engagement feature 76 may be any feature that cooperates with the device housing engagement feature 74 to inhibit rotation of the device 52 with respect to bearing outer ring 62 of bearing 54. The housing device engagement feature 76 may be a separate component or, as shown, be integral with housing 18 (or end cap 44 of housing 18). The housing engagement feature 76 as shown is a groove 76 formed in housing 18 at a position where a recess face 73 meets a recess bore 71 in a recess 75 formed in housing face 77. The recess 75, itself, also serves as the housing device engagement feature.

While the outer flange 74 and the groove 76 may have any shape, for simplicity and as shown in phantom in FIG. 4, the groove 76 is generally cylindrical is shape extending radially outwardly from the recess bore 71 and axially away from recess face 73.

Alternatively, as shown in FIG. 4A, and to permit simpler manufacturing methods, including simpler machining, an alternate embodiment of the device of the present invention in the form of device 52A includes a housing device engagement feature in the form of radially extending groove 76A formed in housing 18A at a position where a recess face 73A meets a recess bore 71A in a recess 75A formed in housing face 77A. The groove 76A, similarly to groove 76 of housing 18, is generally cylindrical is shape. However, groove 76A extends axially outwardly from recess face 73A and perpendicularly from recess bore 71A. Anti-rotation device 52A fits into groove 76A similarly to how the anti-rotation device 52 fits into groove 76 in the housing 18 of FIG. 4. The anti-rotation device 52A may be identical to the anti-rotation device 52 or may have a slightly different configuration to better fit into groove 76A.

Referring again to FIG. 4, the groove 76 may have any size and shape compatible with the outer flange 74 and may a generally rectangular cross section with a width GW and a depth GD that provides for a groove that closely conforms to the outer flange 74. It should be appreciated that the groove 76A and the device 52A (see FIG. 4A) may similarly closely conform with each other. It should be appreciated that the invention may be practiced without the groove with the outer flange 74 of device 52 positioned against recess face 73 and against recess bore 71.

Figure 5:
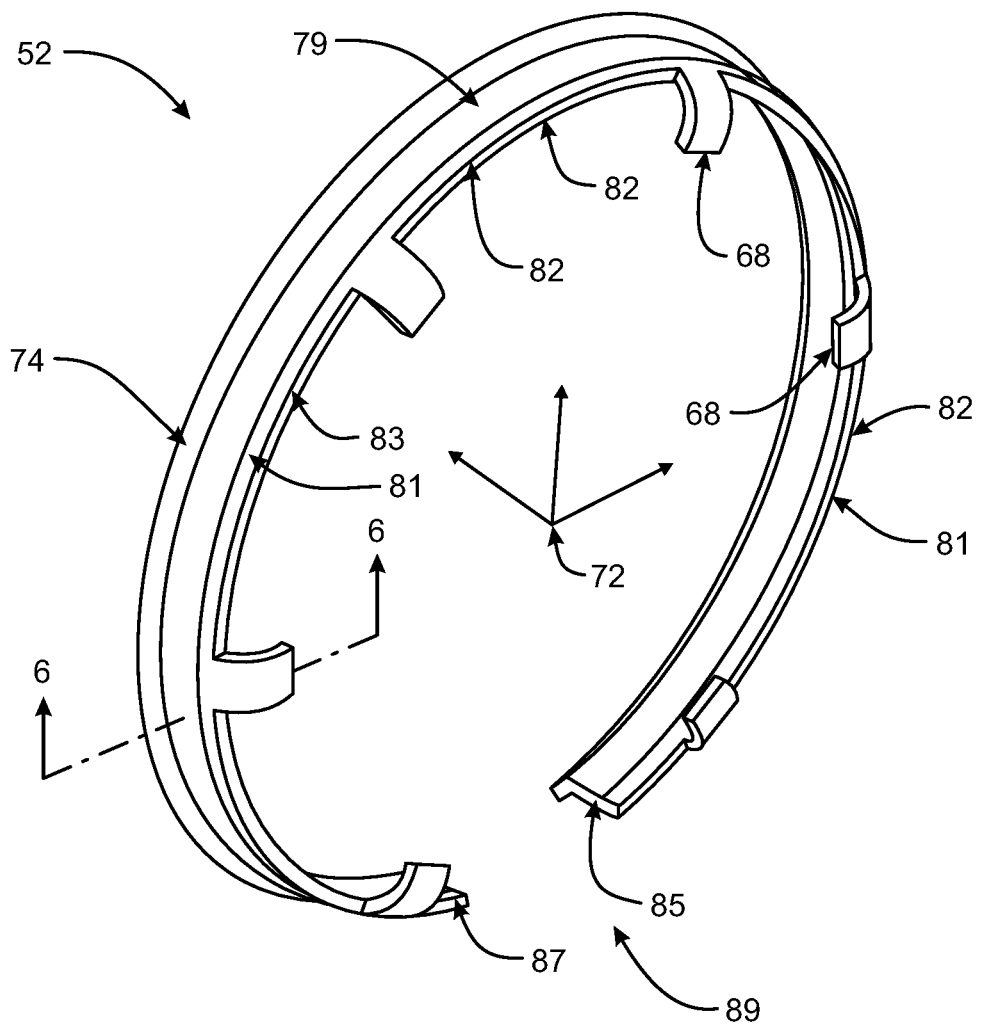
FIG. 5 is a is a perspective view an anti-rotation device for use in the end cap assembly of FIG. 2.

Referring now to FIG. 5, for simplicity and to provide an effective mating feature, the outer flange 74 may have any size and shape compatible with the outer flange 74. For example and as shown, the outer flange 74 is generally cylindrical is shape extending radially outwardly axially away from the central portion 79 of the device 54.

Figure 6:
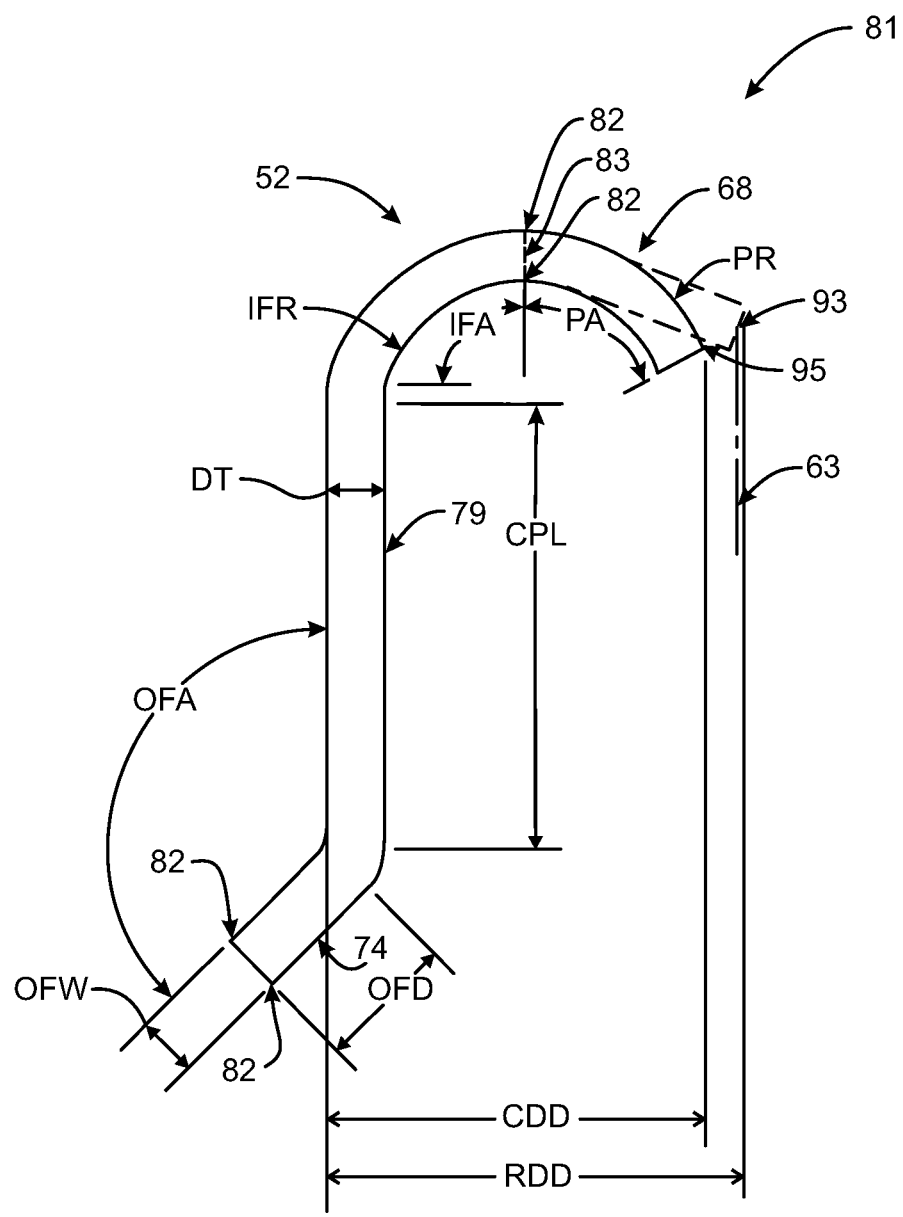
FIG. 6 is a cross sectional view of the anti-rotation device of FIG. 5 along the line 6-6 in the direction of the arrows.

Referring now to FIG. 6, the outer flange 74 may have a generally rectangular cross section with an outer flange width OFW and a outer flange depth OFD that provides for a close conformity to the groove 76 (see FIG. 4). It should be appreciate that the outer flange 74 and the groove 76 may have alternate cross sectional shapes including but not limited to an arcuate shape and an portion of a polygon shape (other than portion of a rectangular shape as shown) or any irregular shape that conform to each other to amply secure the device 52 in the housing 18. The portion of a rectangular shape shown is simple, easy to manufacture and provides ample contact and rigidity to amply secure the device 52 in the housing 18.

Referring again to FIG. 4, the wavy spring 53 is shown in greater detail. The wavy spring 53 has a generally circular hoop shape as shown in FIG. 3, with an arcuate cross section as shown in FIG. 4. It should be appreciated that an additional devices in addition to device 52, such as wavy spring 53, a plastic ring, an O-ring or other devices may be used to provide additional anti-rotational features for the electric machine 10.

Figure 7:
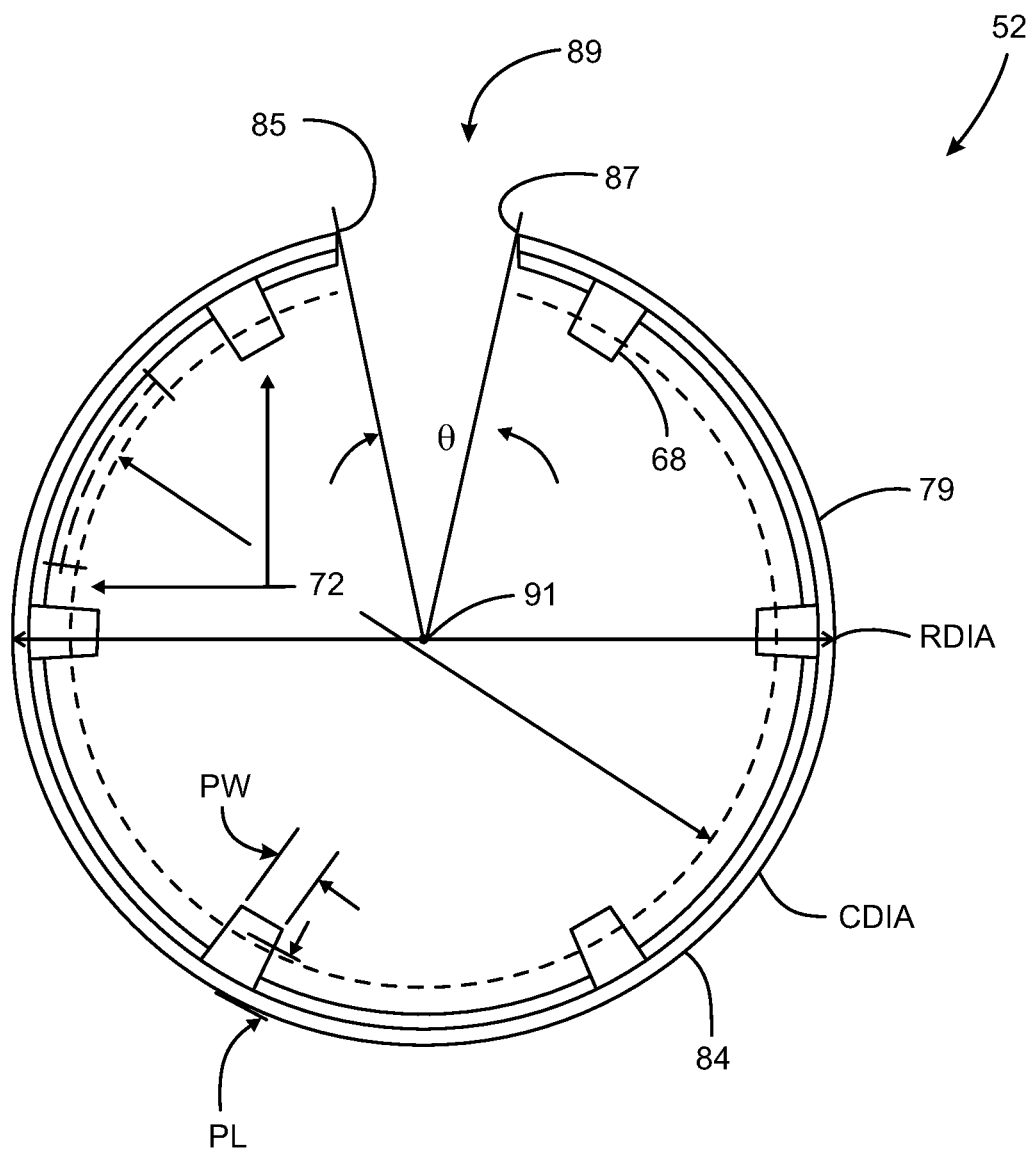
FIG. 7 is a plan view an anti-rotation device according to the present invention for use in the end cap assembly of FIG. 2.

Referring now to FIGS. 5, 6 and 7, the anti-rotation device 52 is shown in greater detail. The anti-rotation device 52, as shown, is generally in the shape of a ring or hoop defined by central portion 79, outer flange 74 and inner flange 81 of device 52. Edges 82 of the outer flange 74 and of the inner flange 81 may be rounded, as shown, or chamfered. The outer flange 74 serves to add rigidity and strength to the device 52 and provides for the second engagement feature 74.

The anti-rotation device 52 further includes the protrusion 68 extending from the inner flange 81. The inner flange 81 serves to add rigidity and strength to the device 52 and provides a location for the first engagement feature 72 in the form of a first protrusion 68. To provide additional inhibitions to the rotation of the bearing outer ring 62, the first engagement feature 72 may further include additional protrusions 68. For example 2, 3, 4, 5 or 6, or more protrusions 68 may be used. As shown, six protrusions 68 are used. Each protrusion extends from end 83 of inner flange 81. As shown, the protrusions 68 are equally spaced around the device 52, for simplicity and to provide a balanced uniform anti-rotation force on the bearing outer ring 62.

The anti-rotation device 52 may be made from a solid ring with a solid central portion 79 or, as shown in FIG. 7, the anti-rotation device 52 may be made from a split ring. Being made from a split ring means that the central portion 79 has a first end 85 and a second end 87 forming an opening 89 defined by angle Θ from centerline 91 of device 54. The protrusions may have any size and shape and may for example have a generally rectangular shape defined by a width PW and a length PL.

Referring again to FIG. 6, the cross section of the device 52 is shown in greater detail. The device has a thickness DT that is generally uniform, but may vary in thickness due to, for example, molding, forming, or strength considerations. The device includes the central portion 79 having a generally rectangular shape having length CPL. The outer flange 74 extends from the central portion 79 at an angle OFA and has a depth OFD. The inner flange 83 extends from the central portion 79 in a direction opposed to the inner flange 74. The inner flange 83 has an arcuate cross section as shown, but other shapes including straight or angular are possible. The inner flange 83, as shown has the arcuate cross section defined by angle IFA and radius IFR. The protrusions 68 have an arcuate cross section, as shown, but other shapes including straight or angular are possible. The protrusions 68, as shown, has the arcuate cross section defined by angle PA and radius PR. For simplicity, the angles IFA and PA are, as shown, the same and the radii IFR and PR are, as shown, the same.

As shown in FIG. 6, the protrusion 68 is typical for all the protrusions, but it should be appreciated that the protrusions may each have a different shape. For simplicity and as shown the protrusions 68 have identical shapes. The protrusions 68 include a protrusion end 93 defining a contract point or tip 95. The tip 95 is configured to engage the end face 63 of bearing outer ring end face 63 of bearing 54 (see FIG. 2). The tip 95 may be oriented as show in a radial direction, normal to end face 63. The tip 95 may have a tip radius sharp enough to engage the end face 63 and may for example have a radius of for example 0 to 0.100 inches or 0 to 0.012 inches.

Referring again to FIGS. 5-7, the first feature 72, as shown, includes a protrusion 68 for engagement with the outer ring 62 of the bearing 54. The second feature 74, as shown, includes a flange 74 for engagement with a groove 76 formed in the bearing housing 18. The anti-rotation device 52 is in the form of a ring. The first feature 72 includes resilient protrusion 68 with contact surface 95 for engagement with the outer face 63 of the outer ring 62 of bearing 54 (see FIG. 2).

Referring again to FIG. 4 and FIG. 6, depth or thickness RT of the recess 75 of housing 18 may be less than the relaxed device depth RDD from the tip 95 to the central portion 79 of the device 52. When designed with such relative dimensions, the device 52 when positioned in recess 75 is compressed from a relaxed device depth RDD to a compressed device depth CDD which is equal to the depth RT of the recess 75. This axial compression of device 52 imparts a force to the tip 95 of device 52 to secure the housing 18 to outer ring 62 of bearing 54.

Referring again to FIG. 4 and FIG. 7, recess diameter RD of the groove 76 of the recess 75 of housing 18 may be less than the relaxed device diameter RDIA of outer edge 84 of inner flange 74 of the device 52. When designed with such relative dimensions, the device 52 when positioned in recess 75 is compressed from a relaxed device diameter RDIA to a compressed device diameter CDIA which is equal to the recess diameter RD of the groove 76 of the recess 75 of housing 18. This radial compression of device 52 serves to secure the device 52 into the groove 76 of the housing 18.

The anti-rotation device 52 may be made of any suitable durable material or materials and may, for example be made of a metal, a polymer or a composite material. For example, the anti-rotation device 52 may be made of a steel, for example spring steel. Spring steel may be particularly efficient at providing a sufficient spring constant to provide adequate force of device 52 against bearing 54 to prevent bearing creep. The device 52 may be made by any suitable process, such as molding, casting, forming or machining, etc. The device 52 with the opening 89 may be made of a metal that is resilient or springs so that it may be collapsed and inserted into the recess 75 with the flange 74 engaging the groove 76 to retain the device 52 in housing 18. It should further be appreciated that the relative hardness of the tip 95 of the device 52 may be made hard enough relative to the outer ring outer diameter 70 so that the device 52 may engage the bearing outer ring 62, preventing rotation of the outer ring 62 of bearing 54.

Referring now to FIGS. 8-12, another embodiment of the bearing assembly of the present invention is shown wherein the anti-rotation device and the wavy washer are combined into a single component.

Figure 8:
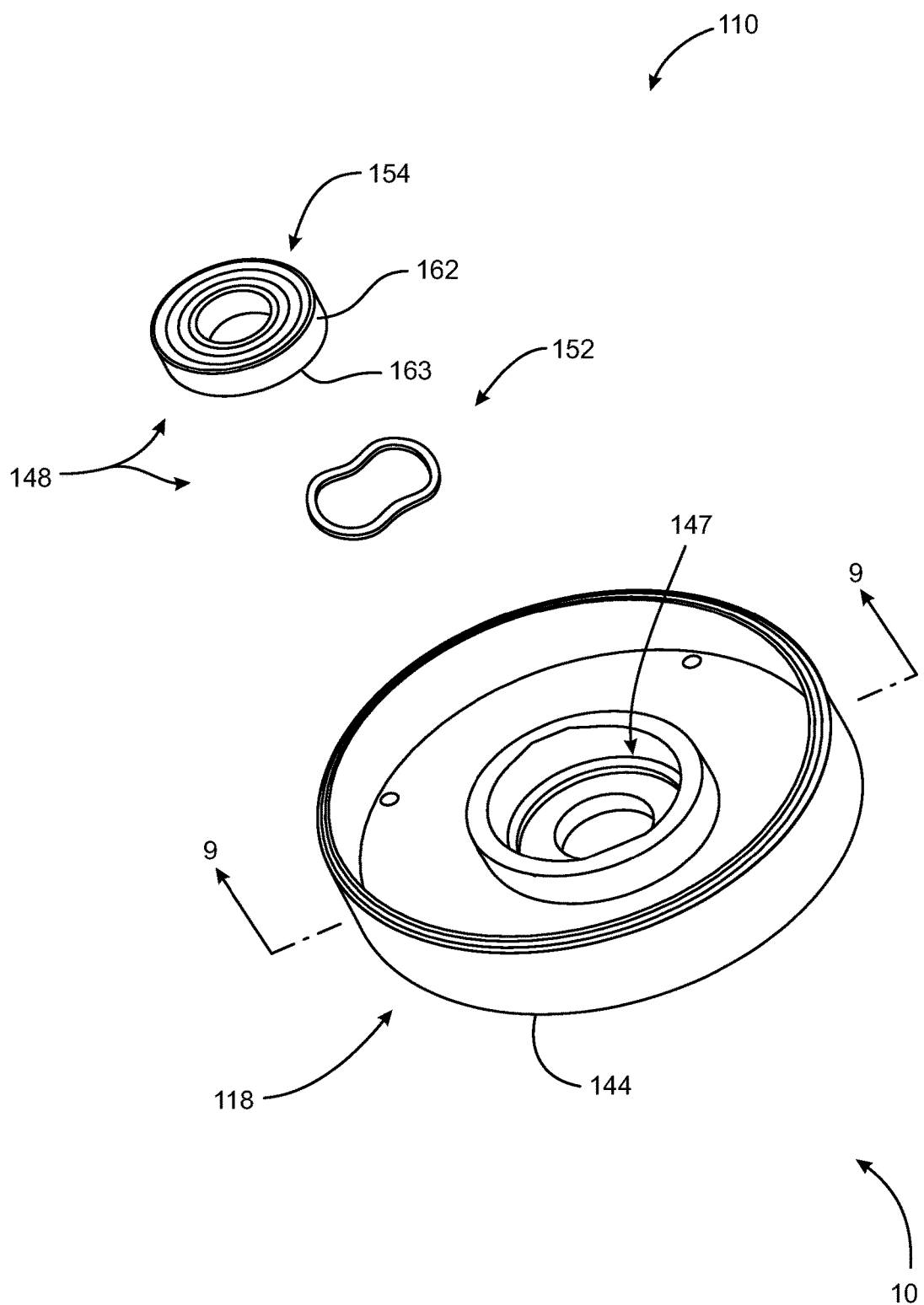
FIG. 8 is an exploded perspective view, partly in cross section, of another embodiment of an end cap assembly of a motor embodying the bearing assembly having the anti-rotation device of the present invention.
Figure 9:
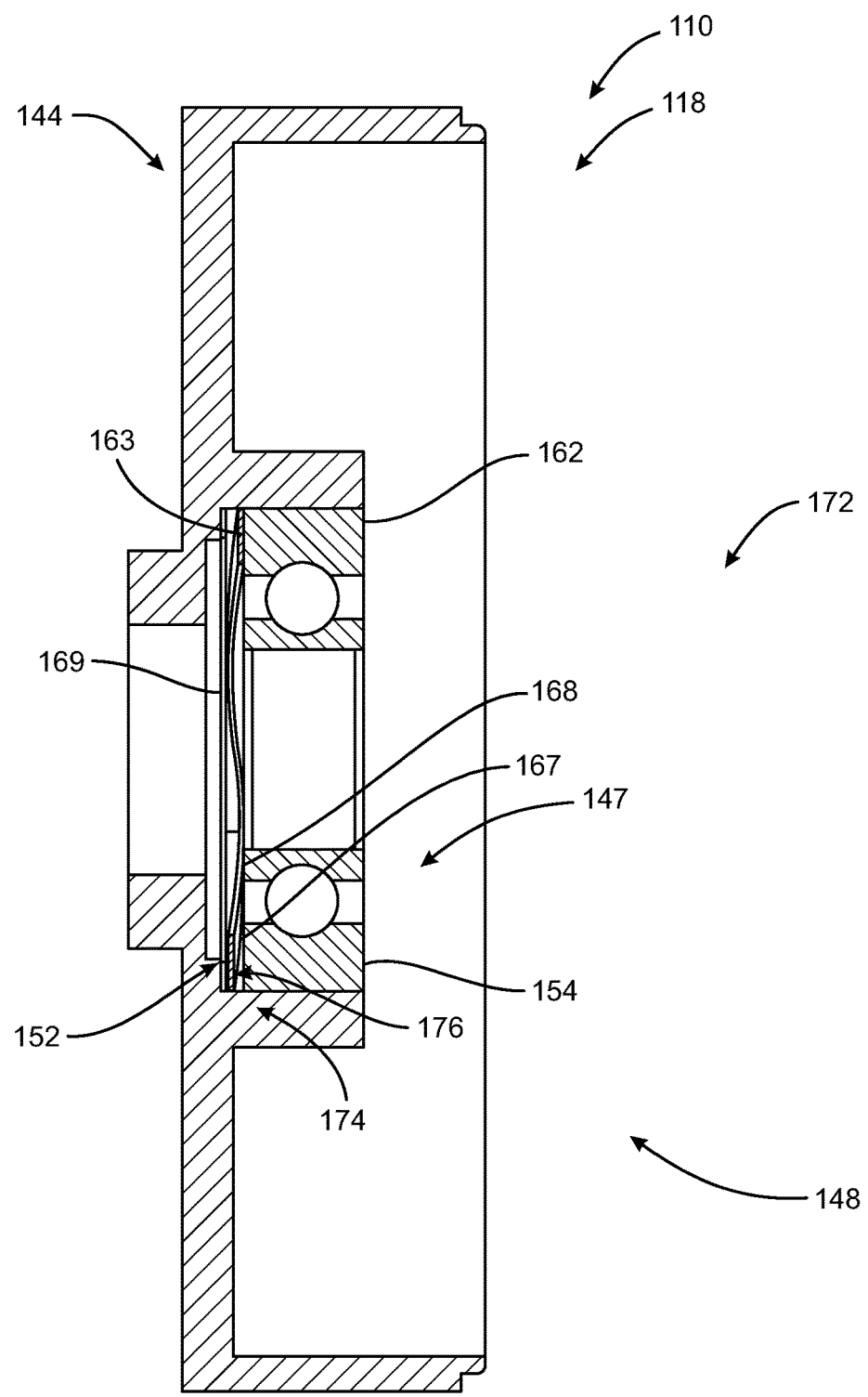
FIG. 9 is a cross sectional view of the end cap assembly of FIG. 8 along the line 9-9 in the direction of the arrows.

Referring now to FIGS. 8 and 9, another embodiment of the bearing assembly of the present invention is shown as electric machine 110. Electric machine 110 is similar to electric machine 10, except that electric machine 110 combines the anti-rotation device and the wavy washer into a single component, which will be discussed in greater detail below.

Similarly to electric machine 10 of FIGS. 1-7, electric machine 110 of FIGS. 8-12 include upper and lower bearing assemblies which may either contain an anti-rotation device 152 according to the present invention. The upper and lower bearing assemblies may be directly mounting into a housing 118 of motor 110 or may, as shown in FIG. 8, be mounted in housing end caps. For example and as shown in FIG. 8, upper bearing assembly 148 may be mounted in upper end cap 144. Upper end cap 144 is similar to upper end cap 44 of the electric machine 10 of FIGS. 1-7. The upper bearing assembly 148 includes bearing 154. Bearing 154 is similar to bearing 54 of the electric machine 10 of FIGS. 1-7.

The upper bearing assembly 148 further includes the anti-rotation device 152. The anti-rotation device 152 and the bearing 154 are shown in FIG. 8 in an exploded position for assembly into bore 147 of end cap 144 of housing 118 of motor 110. It should be appreciated that additional components may be used to complete the motor 110 of present invention. For example, anti-rotation device 52 of FIGS. 1-7 may be used with the anti-rotation device 152 of FIGS. 8-12.

The device 152 may, as shown in FIG. 9, engage outer ring 162 at outer ring end face 163 of outer ring 162 of bearing 154. The engagement of device 152 to end face 163 may, as shown, be made by a device bearing side protrusion 168 which engages outer ring end face 163 of outer ring 162 of bearing 154 and serves as the first or device housing engagement feature 172 of device 152.

The anti-rotation device 152, as shown, also engages the motor assembly housing 118 in any effective way and may, as shown, be made by a device housing side protrusion 169 which engages housing device engagement feature 176 of housing 118 and serves as the second or device housing engagement feature 174 of device 152.

The housing device engagement feature 176 may be any feature that cooperates with the device housing engagement feature 174 to inhibit rotation of the device 152 in bearing outer ring 162 of bearing 154. The housing device engagement feature 176 may be a separate component or, as shown, be integral with housing 118 (or end cap 144 of housing 118). The housing engagement feature 176 as shown is an end face 167 of end cap bore 147 of end cap 144 of housing 118 of motor 110.

Figure 10:
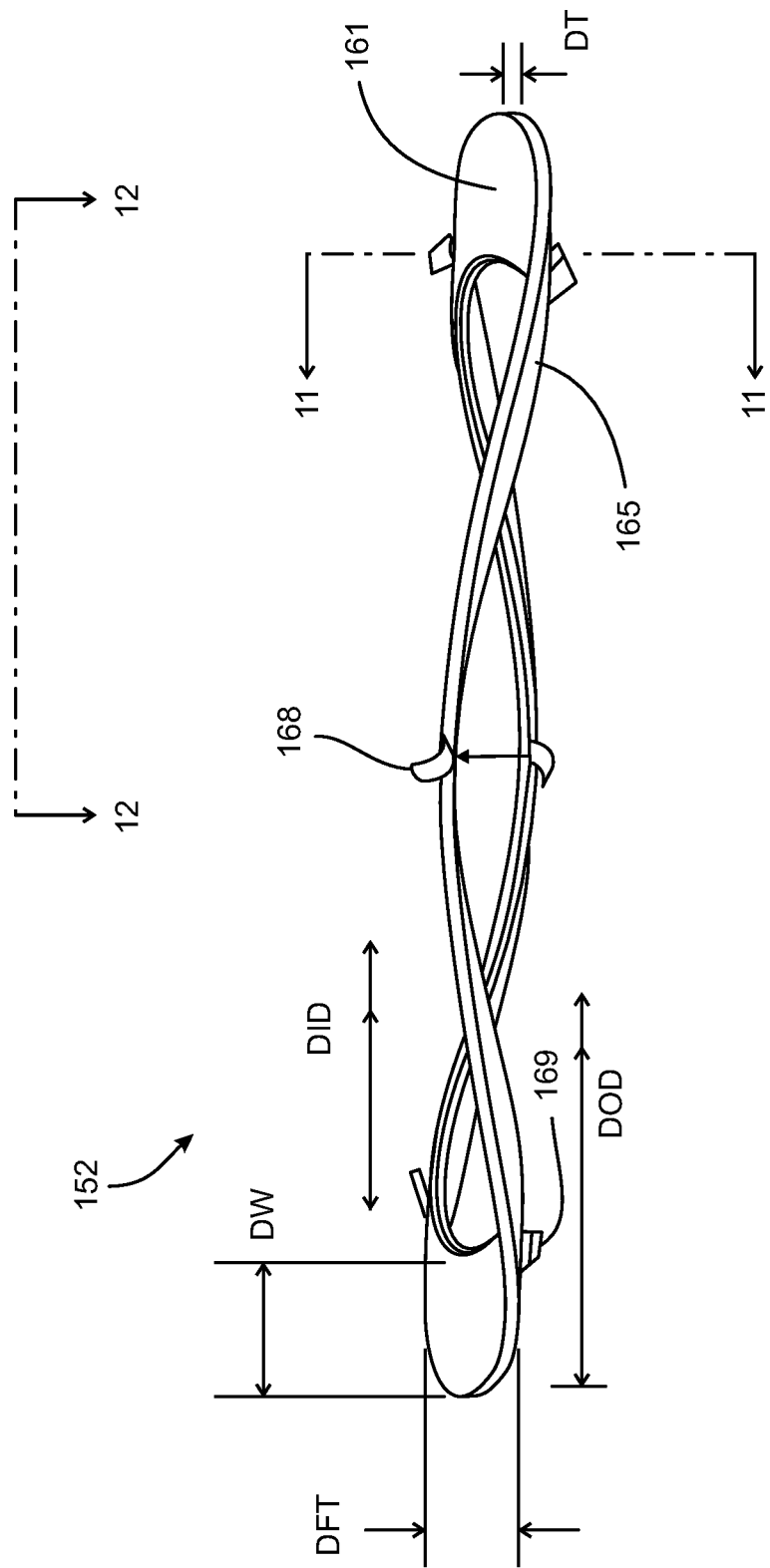
FIG. 10 is a is a plan view an anti-rotation device for use in the end cap assembly of FIG. 8.

Referring now to FIGS. 9 and 10, the anti-rotation device 152 is shown in greater detail. The anti-rotation device 152 as shown serves a second function as a load washer. A load washer serves to place a preload on the bearing 154. As shown the load washer is in the form of, for example, a wavy washer 152 and may be positioned between the bearing 154 and the face 167 of the housing bore 147. The wavy washer 152 serves to place a preload on the bearing 154. Note that the device 152 has a device form thickness DFT that is greater than the device thickness DT. When the device is compressed axially in assembly to reduce the device form thickness DFT, the device will place a preload on the bearing 154.

Referring again to FIG. 10, the anti-rotation device 152 may as shown have generally circular hoop shape and may be defined by device outer diameter DOD, device inner diameter DID, device thickness DT and device formed thickness DFT. The cross section of the anti-rotation device 152 may have any shape and may for example be arcuate, circular, a polygon, square or rectangular. As shown the cross section of the anti-rotation device 152 is rectangular.

The anti-rotation device 152, as shown, is twisted, deformed or wavy in order to be used as a wavy washer to place a preload on the bearing 154. The anti-rotation device 152 includes a device bearing side protrusion 168 and an opposed device housing side protrusion 169. The device bearing side protrusion 168 extends outwardly from first face 161 of the anti-rotation device 152. Similarly, the device housing side protrusion 169 extends outwardly from second face 165 of the anti-rotation device 152. As shown the device 152 has three wavys creating 3 high spots on each of the first face 161 and the second face 165. In order that the anti-rotation device 152 engages only the outer ring 162 of bearing 154, the device inner diameter DID is similar to the corresponding inner diameter of the outer ring 162 of bearing 154. If the anti-rotation device 152 engages the inner ring of bearing 154 the bearing may be axially preloaded. Excessive axial bearing preloads may result in reduced bearing life.

While a solitary device housing side protrusion 169 and a solitary device bearing side protrusion 168 may be sufficient a plurality of protrusions may be used on either side of the device 152. For example, 2, 3 or more protrusions may be used on each side. For example, and as shown in FIG. 10 three solitary device housing side protrusions 169 and the solitary device bearing side protrusions 168 are used in the device 152.

As shown the anti-rotation device 152 has the shape of a wavy washer. As such the device has a wavy shape and has high spots that contact the mating faces of mating parts first. Since these high spots are deflected more that other portions of the device 152 when installed in a compressed configuration against the mating surfaces of the bearing and the housing, these high spots are best suited for placement of the protrusions 168 and 169 in that protrusions positioned at the high spots are more likely to engage these mating surfaces and to be in greater compression, exerting more force against the mating surfaces to better engage these surfaces and provide a greater anti-rotation force. It should be appreciated that the protrusions may be placed at other locations and still be effective as an anti-rotation device depending on the height of the protrusion, the extent of the waviness of the device and the amount of compression of the device when installed. While the protrusions may be positioned anywhere on the faces 161 and 165, for the device shown in FIG. 10 with equally three high spots on each face and with the high spots on opposed faces being staggered from each other, for the reasons explained above, the protrusions are preferable spaced 60 degrees apart in the positions corresponding to those high spots.

The protrusions may be centrally positioned along the width DW of the device 152, as shown, or may be, particularly if plural protrusions are used on each side, be both on and off center or staggered to engage different radial areas of the mating surfaces.

It should be appreciated that the protrusions 168 and 169 may be identical or different from each other. Since the device 152 is symmetrical, it may physically be installed into the motor 110 with either the first face 161 of device 152 adjacent the bearing 154, as shown in FIGS. 8 and 9, or with the second face 165 of device 152 adjacent the bearing 154. Therefore, to avoid backward or improper installation, it may be preferred to provide a symmetrical device 152 as shown.

It should also be appreciated since the hardness is typically greater for the bearing 154 than the housing 118 and since the surface finish of outer ring end face 163 of outer ring 162 of bearing 154 is typically smoother than end face 167 of end cap bore 147 of end cap 144 of housing 118, the device 152 may require that a device bearing side protrusion 168 be used. The second face 165 which is adjacent the housing 118 may be void of protrusions and the device 152 may still perform effectively if properly installed.

The protrusions 168 and 169 may have any size, shape, or configuration which is effective in adding anti-rotation force between the device and the bearing 154 and the housing 118. As mentioned earlier, the typical higher hardness and smoother surface of the bearing 154 may make the effectiveness of adding anti-rotation force between the device 152 and the bearing 154 more critical that between the device 152 and the housing 118. Alternate shapes of the protrusion in the form of an arm or finger with an arcuate, round, polygon, or any irregular shape are anticipated.

Alternatively, the protrusion may have a form other than that of an arm or finger, and may be any raised area extending from the smooth faces 161 and 165 of the device 152. Such a protrusion may be, for example, machined, cast, formed, or coated onto faces 161 and 165. For example, the protrusion may be in the form of an irregular coating applied to faces 161 and 165, for example a coating of a material, preferably hard, onto the faces 161 and 165, for example a carbide coating. If a coating is used, it should be selected and applied so that it will adhere and remain on the surface of the device 152, as a coating that separates from the surface of the device 152 may contaminate any lubricant used to lubricate the bearings 154 or may migrate to another portion of the motor 10 potentially causing reliability problems to the motor 10 generally and more particularly to the bearings 154.

Figure 11:
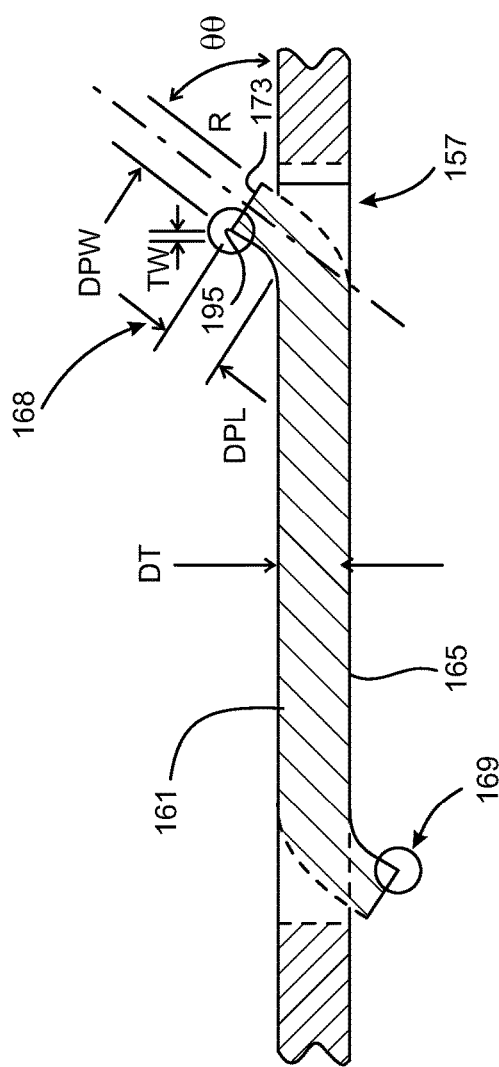
FIG. 11 is a partial cross sectional view of the anti-rotation device of FIG. 10 along the line 11-11 in the direction, with the anti-rotation device compressed into a flat or planar condition.

Referring now to FIG. 11, the device bearing side protrusion 168 and the device housing side protrusion 169 are shown in greater detail and when full compressed. As shown the device bearing side protrusion 168 extends from first face 161 of device 152 and the device housing side protrusion 169 extends from second face 165 of device 152. As shown the protrusions 168 and 169 are identical and the bearing side protrusion 168 will be described in greater detail, but such description applies equally to either protrusion 168 or protrusion 169. The device 152 is shown in FIG. 11 as planar. Such a configuration is only accurate for the device 152 shown if fully compressed when assembled into the motor 10. When in a free state, the device is wavy, as shown in FIG. 10.

Figure 12:
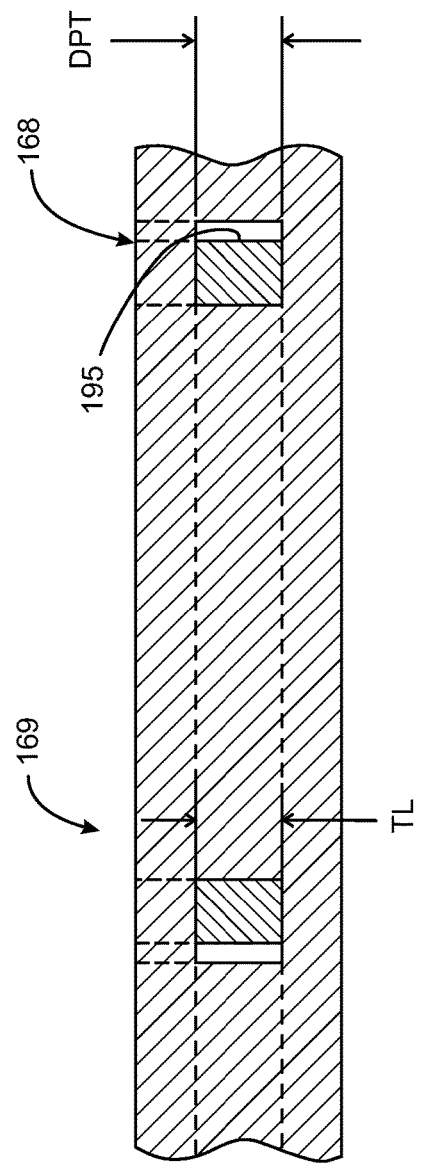
FIG. 12 is a partial view of the anti-rotation device of FIG. 10 along the line 12-12 in the direction of the arrows.

Referring to FIG. 11 and FIG. 12, the protrusion 168 as shown is formed, upset or punched from the device 152, leaving an opening 157 where the material for the protrusion 168 was taken. The protrusion 168 has a generally rectangular shape defined by device protrusion length DPL, device protrusion width DPW and device protrusion thickness DPT. The device protrusion width DPW is dependent on the device thickness DT, when formed therefrom. The protrusion extends, for example at an angle $\Theta\Theta$ from face 161. The angle $\Theta\Theta$ may be any angle and may be for example 0-90 degrees or around 20-70 degrees.

The protrusion 168 includes a tip 195 that is positioned on the distal end 173 of the protrusion and opposed to face 161. The tip 195 is configured to provide sufficient friction or anti-rotation force to prevent creep. For example the tip is relatively sharp or pointed and may have a radius or chamfer. The Tip may have a tip width that is relatively small for example 0.100 inches or less, for example 0.020 inches or less. The tip may further have a tip length TL, see FIG. 12, that may be similar to device protrusion thickness DPT. Alternative protrusion 168 may be formed into a non linear shape along the device protrusion thickness DPT to provide a tip length TL that substantially less than the device protrusion thickness DPT to provide potentially greater friction or anti-rotation force to prevent creep.

It should be appreciated a plastic ring, an O-ring or other devices may be used in addition to device 152 to provide additional anti-rotational features for the electric machine 110.

The anti-rotation device 152 may be made of any suitable durable material or materials and may, for example be made of a metal, a polymer or a composite material. For example, the anti-rotation device 152 may be made of a steel, for example spring steel. Spring steel may be particularly efficient at providing a sufficient spring constant to provide adequate force of device 152 against bearing 154 to prevent bearing creep. The device 152 may be made by any suitable process, such as molding, casting, forming or machining, etc.

Figure 13:
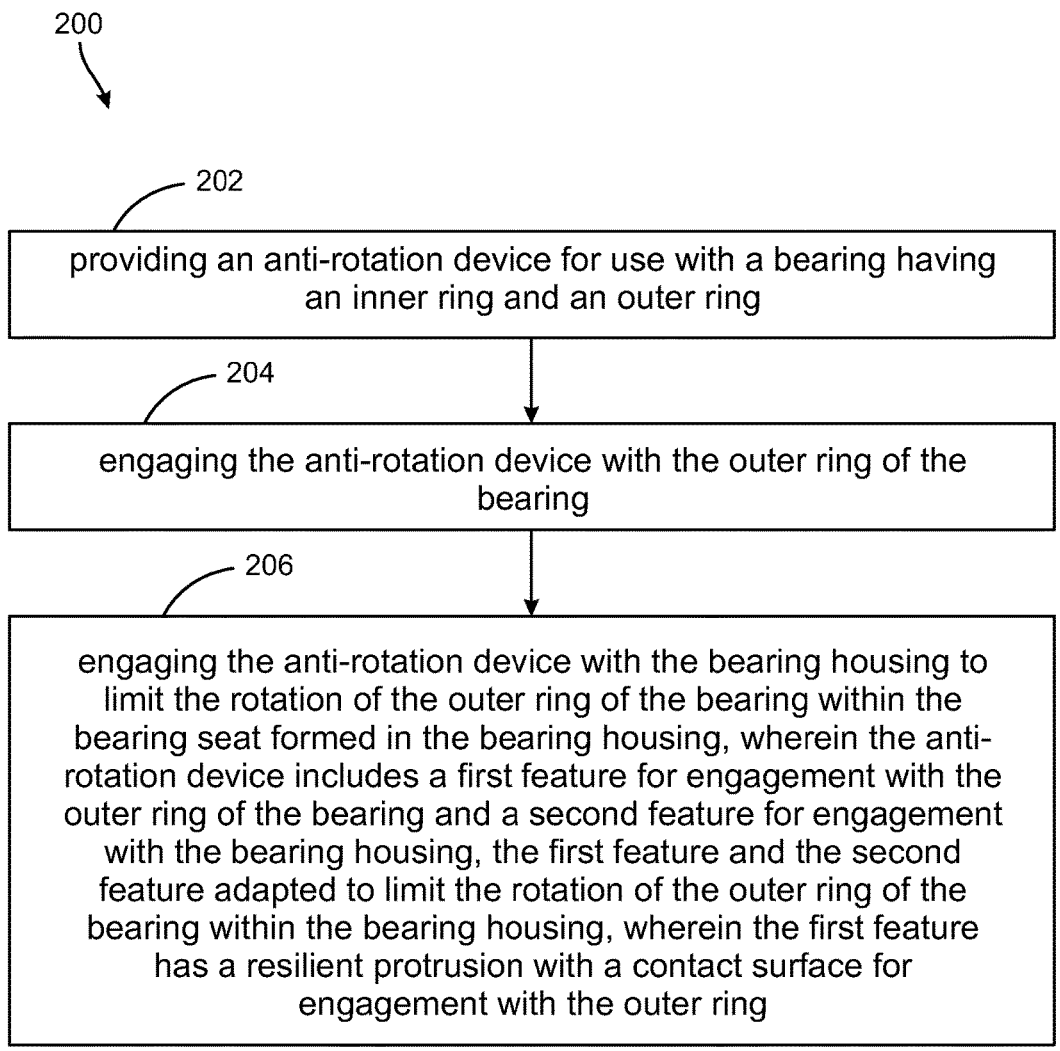
FIG. 13 is a flow chart of an exemplary method for utilizing the bearing assembly as shown in FIG. 1.

Referring now to FIG. 13, a flow chart of an exemplary method 200 for containing a bearing in an electric machine (see FIG. 1) is shown. The method 200 includes the step 202 of providing anti-rotation device 52 (see FIG. 4) for use with bearing 54 or anti-rotation device 152 (see FIG. 9) for use with bearing 154 either having an inner ring and an outer ring, the step 204 of engaging the anti-rotation device with the outer ring of said bearing and the step 206 of engaging the anti-rotation device with the bearing housing to limit the rotation of the outer ring of said bearing within the bearing seat formed in the bearing housing.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly for use in an electric machine, said assembly for cooperation with a bearing seat formed in a bearing housing, the bearing housing defining a bearing housing circumferential groove, said assembly comprising:
    a bearing, said bearing including an inner ring, an outer ring and a rolling element in engagement with said inner ring and said outer ring; and
    an anti rotation device, said anti rotation device adapted for engagement with the outer ring of said bearing and with the bearing housing, said anti rotation device having a plurality of spaced apart protrusions extending continuously arcuately inwardly toward the outer ring of the bearing for engagement with the outer ring of said bearing, a central portion extending from and supporting the plurality of spaced apart protrusions and an inner flange extending radially and axially outwardly from the central portion and configured for engagement with the bearing housing circumferential groove at least one of said resilient protrusions having a contact surface for engagement with said outer ring, at least one of said protrusions being axially compressed when engaged with the inner ring of the bearing.

2. An assembly in accordance with claim 1, wherein said anti rotation device comprises a wave ring and wherein said resilient protrusion extends from said wave ring.

3. An assembly in accordance with claim 2, wherein said resilient protrusion is in the form of at least one of an irregular coating, an arm formed from the ring, and a rigid raised area extending from said wave ring.

4. An assembly in accordance with claim 1, wherein said anti rotation device comprises a resilient ring adapted to expand and contract in a radial direction to cooperate with the bearing seat.

5. An assembly in accordance with claim 4,
    wherein said resilient ring comprises a split ring; and
    wherein said resilient ring comprises a generally hoop shaped first portion adapted for engagement with the circumferential groove formed in the bearing housing.

6. An anti rotation device for use with a bearing having an inner ring and an outer ring, the outer ring having a cylindrical outer periphery thereof, the bearing adapted for mounting in a bearing seat of a housing of an electric machine, said anti rotation device adapted for engagement with a bearing housing circumferential groove formed in the outer ring of said bearing and with the bearing housing, said anti rotation device defining a split ring having a central portion with opposed parallel faces, a plurality of spaced apart protrusions extending radially inwardly and axially outwardly from one of the opposed parallel faces toward the outer ring of the bearing for engagement with the outer ring of said bearing, and an inner flange extending radially inwardly and axially outwardly from the other of the opposed parallel faces of the central portion and configured for engagement with the bearing housing circumferential groove.

7. An anti rotation device in accordance with claim 6, wherein said anti rotation device comprises a wave ring and wherein said resilient protrusion extends from said wave ring.

8. An anti rotation device in accordance with claim 7, wherein said resilient protrusion is in the form of at least one of an irregular coating, an arm formed from the ring, and a rigid raised area extending from said wave ring.

9. An anti rotation device in accordance with claim 6, further comprising a second anti-rotation device spaced from the first mentioned anti rotation device, the first mentioned anti-rotation device adapted for contact with an outer diameter of the outer ring of said bearing and the first mentioned anti-rotation device adapted for contact with an end face of the outer ring of said bearing.

10. An electric machine comprising:
    a housing defining a circumferential groove formed thereon;

a stator secured to said housing;

a rotor rotatable associated with said housing, said rotor supported by a shaft;

a bearing having an inner ring and an outer ring, said bearing rotatably securing said rotor to said housing; and an anti rotation device for use with said bearing, said bearing mounted in said housing of the electric machine, said anti rotation device adapted for engagement with the outer ring of said bearing and with the bearing housing, wherein said anti rotation device includes a protrusion extending continuously arcuately inwardly toward the outer ring of the bearing for engagement with the outer ring of the bearing, a central portion extending from and supporting the protrusion and an inner flange extending radially and axially outwardly from the central portion and positioned at least partially within the circumferential groove of the housing, at least one of said protrusions being axially compressed when engaged with the inner ring of the bearing.

11. An electric machine in accordance with claim 10, wherein said anti rotation device comprises a wave ring and wherein said resilient protrusion extends from said wave ring.

12. An electric machine in accordance with claim 11, wherein said resilient protrusion is in the form of at least one of an irregular coating, an arm formed from the ring, and a rigid raised area extending from said wave ring.

13. An electric machine in accordance with claim 10, wherein said anti-rotation device comprises a resilient ring.

14. An electric machine in accordance with claim 13, wherein said resilient ring comprises a split ring;

wherein said resilient ring comprises a generally hoop shaped first portion; and wherein said resilient protrusion extends from the first portion.

15. An electric machine in accordance with claim 10, further comprising a second resilient protrusion, spaced from said first mentioned resilient protrusion.

16. An electric machine in accordance with claim 10:

wherein said resilient protrusion includes an arcuate portion; and wherein the distal end of said resilient protrusion is pointed inwardly toward the bearing seat.

17. An electric machine in accordance with claim 10, further comprising a second anti-rotation device spaced from the first mentioned anti rotation device, the first mentioned anti-rotation device adapted for contact with an outer diameter of the outer ring of said bearing and the first mentioned anti-rotation device adapted for contact with an end face of the outer ring of said bearing, wherein said resilient ring comprises a split ring.

18. A method for containing a bearing in an electric machine, comprising:

providing an anti rotation device for use with a bearing having an inner ring and an outer ring having a cylindrical outer periphery thereof and adapted for mounting in a bearing housing;

engaging the anti rotation device with the outer ring of said bearing; and engaging the anti rotation device with a circumferential groove formed in the bearing housing, wherein said anti rotation device a defines a split ring having a central portion with opposed parallel faces, a plurality of equally spaced apart protrusions extending radially inwardly and axially outwardly from one of the opposed parallel faces toward the outer ring of the bearing for engagement with the outer ring of said bearing, and an inner flange extending radially inwardly and axially outwardly from the other of the opposed parallel faces of the central portion and configured for engagement with the bearing housing circumferential groove.

\* \* \* \* \*